US008918345B2

(12) United States Patent
Kings et al.

(10) Patent No.: US 8,918,345 B2
(45) Date of Patent: Dec. 23, 2014

(54) NETWORK ANALYSIS SYSTEM

(75) Inventors: Nicholas J Kings, Ipswich (GB); Nicholas J Davies, Colchester (GB); John P Wittgreffe, Woodbridge (GB); Blaz Fortuna, Gorenja Vas (SI); Marko Grobelnik, Kranj (SI)

(73) Assignee: British Telecommunications public limited company, London (GB)

( * ) Notice: Subject to any disclaimer, the term of this patent is extended or adjusted under 35 U.S.C. 154(b) by 395 days.

(21) Appl. No.: 13/262,069

(22) PCT Filed: Mar. 31, 2010

(86) PCT No.: PCT/GB2010/000640
§ 371 (c)(1),
(2), (4) Date: Feb. 17, 2012

(87) PCT Pub. No.: WO2010/112855
PCT Pub. Date: Oct. 7, 2010

(65) Prior Publication Data
US 2012/0136816 A1 May 31, 2012

(30) Foreign Application Priority Data

Mar. 31, 2009 (GB) .................................. 0905566.6

(51) Int. Cl.
*G06F 15/18* (2006.01)
*H04L 12/24* (2006.01)
(52) U.S. Cl.
CPC .......... *H04L 41/0681* (2013.01); *H04L 41/147* (2013.01)
USPC ......................................................... 706/12
(58) Field of Classification Search
USPC ......................................................... 706/12
See application file for complete search history.

(56) References Cited

U.S. PATENT DOCUMENTS

| 6,012,152 | A | 1/2000 | Douik et al. |
| 6,253,208 | B1 * | 6/2001 | Wittgreffe et al. ..................... 1/1 |
| 6,353,902 | B1 | 3/2002 | Kulatunge et al. |
| 2002/0019870 | A1 * | 2/2002 | Chirashnya et al. .......... 709/224 |
| 2002/0183866 | A1 | 12/2002 | Dean et al. |
| 2007/0174449 | A1 | 7/2007 | Gupta |

OTHER PUBLICATIONS

Automatic Discovery of Rules for Predicting Network Management Events Marlon Núñez, Rafael Morales, and Francisco Triguero.*
International Search Report for PCT/GB2010/000640, mailed Jun. 18, 2010.
Zhiqiang, C. et al., "Maintenance Management System Based on Bayesian Networks", Business and Information Management, (Dec. 19, 2008), pp. 42-45.
Shunshan, P. et al., "Root Cause Analysis and Proactive Problem Prediction for Self-Healing", (Nov. 21, 2007), pp. 2085-2090.

* cited by examiner

*Primary Examiner* — Wilbert L Starks
*Assistant Examiner* — Ababacar Seck
(74) *Attorney, Agent, or Firm* — Nixon & Vanderhye P.C.

(57) ABSTRACT

The present invention provides a method of operating a network comprising the steps of: analyzing a first datastore comprising data representing historical network performance; creating or more indices within the first datastore; creating one or more probability networks in accordance with one or more of the created indices; determining from the one or more probability networks a conditional probability associated with an alarm event; and' if the conditional probability determined is less than a threshold value, disregarding the associated alarm event; or if the conditional probability determined is greater than a threshold value, using the associated alarm event in conjunction with other historical network data to predict future alarm events.

10 Claims, 8 Drawing Sheets

Figure 7
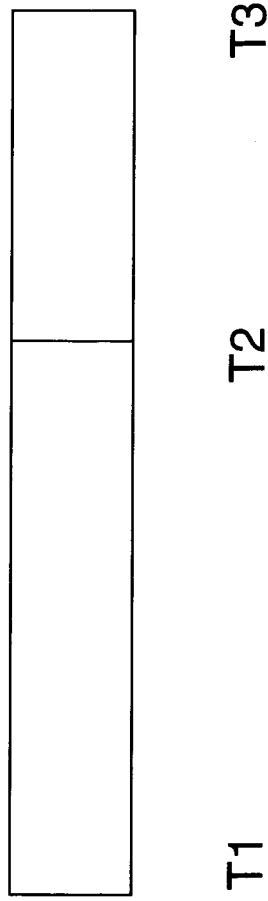
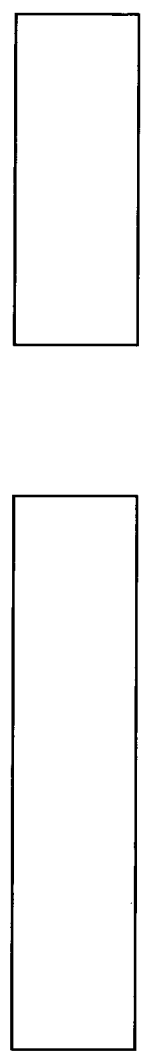
Figure 7a
Figure 7b

NETWORK ANALYSIS SYSTEM

This application is the U.S. national phase of International Application No. PCT/GB2010/000640, filed 31 Mar. 2010, which designated the U.S. and claims priority to GB Application No. 0905566.6 filed 31 Mar. 2009, the entire contents of each of which are hereby incorporated by reference.

BACKGROUND

1. Technical Field

The present invention relates to a method of operating a network, and in particular to a method of analysing historic network alarms to predict future alarm events and to suggest automatically potential solutions.

2. Related Art

Networks, such as telecommunications networks for example, are becoming larger and more complex, making the detection of errors and the diagnosis of faults more difficult. Rather than detecting a fault condition error when it occurs it is preferable to be able to detect one or more operational conditions that may lead to, a fault prior to a fault condition actually occurring.

BRIEF SUMMARY

According to a first aspect of the present invention there is provided a method of operating a network, the method comprising the steps of: a) analysing a first datastore comprising data representing historical network performance; b) creating or more indices within the first datastore; c) creating one or more probability networks in accordance with one or more of the indices created in step b); d) determining from the one or more probability networks a conditional probability associated with an alarm event; and e) if the conditional probability determined in step d) is less than a threshold value, disregarding the associated alarm event; or f) if the conditional probability determined in step d) is greater than a threshold value, using the associated alarm event in conjunction with other historical network data to predict future alarm events. The method may comprise the further step of g) identifying one or more root cause alarm event from a set of such events.

The probability networks may comprise a plurality of nodes, each of the nodes corresponding to a network element comprised within the network, wherein each of the probability network nodes are weighted in accordance with the probability that the corresponding network element generates an alarm event. The probability networks may comprise a plurality of undirected edges, each of the undirected edges connecting a respective first node and a respective second node, wherein each of the plurality of undirected edges is weighted in accordance with the probability that the network element associated with the respective first node and the network element associated with the respective second node both generate an alarm event within a predetermined period of time. The probability networks may further comprise a plurality of directed edges, each of the directed edges connecting a respective first node and a respective second node, wherein each of the plurality of directed edges is weighted in accordance with the probability that: i) the network element associated with the respective first node generates a first alarm event; ii) the network element associated with the respective second node generates a second alarm event; and iii) the second alarm event being generated after the first alarm event and within a predetermined period of time after the generation of the first alarm event.

According to a second aspect of the present invention there is provided a data carrier device comprising computer executable code for performing a method as described above.

According to a third aspect of the present invention there is provided an apparatus comprising a central processing unit, volatile data storage means and non volatile data storage means, the apparatus being configured, to perform a method as described above.

BRIEF DESCRIPTION OF THE DRAWINGS

Embodiments of the present invention will now be described, by way of example only, with reference to the accompanying drawings in which:

FIG. 7 shows a schematic depiction of time periods for which changes in network events can be determined;

DETAILED DESCRIPTION OF EXEMPLARY EMBODIMENTS

Figure 1:
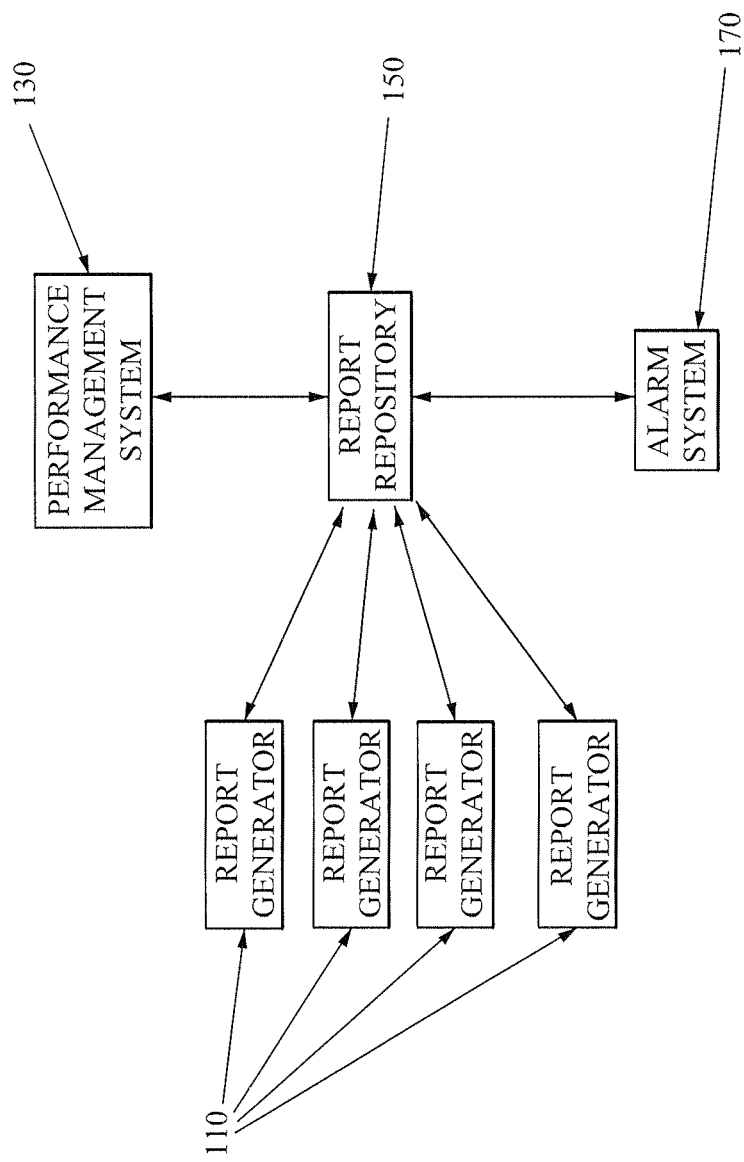
FIG. 1 shows a schematic depiction of a conventional system which can be used to record and manage fault reports and other operational reports which are generated in the operation of a communications network.

FIG. 1 shows a schematic depiction of a conventional system which can be used to record and manage fault reports and other operational reports which are generated in the operation of a communications network. For the sake of clarity the actual network which is being managed by the system shown in FIG. 1 is not shown. The system comprises one or more report generators 110, performance management system 130, report repository 150, and alarm system 170. Each of the one or more report generators are associated with one or more network elements such as applications, servers, network nodes (such as switches, routers, etc.), etc. In operation the network elements, or the management systems associated with those network elements, will cause the report generator to send one or more reports to the report repository 150. The one or more reports may comprise status reports, error reports, reports of particular parameters or settings associated with a network element or more general performance reports for one or more network elements.

The reports held within the report repository can be accessed from the performance management system 130 such that a user may examine the various reports associated with a particular type of network element(s) or with a number of elements which are geographically co-located, which comprise a particular sub-system or which provide a particular service. If fault reports are received by the report repository then the alarm system will generate one or more fault alarms as appropriate. The fault alarms allow one or more remedial actions to be taken, for example; re-routing a transmission circuit to a redundant transmission route, activating additional hardware to provide additional capacity, allocating maintenance workers to repair or replace malfunctioning equipment, etc. The fault conditions that caused the fault alarms to be initiated are also available from the performance management system. A user of the performance management system may thus examine the reports and/or fault alarms to determine any problems that are occurring in the network. The extent to which an user is able to diagnose potential fault conditions is limited by both the data that is reported by the report generators and the knowledge, skill and experience of the operator.

Figure 2:
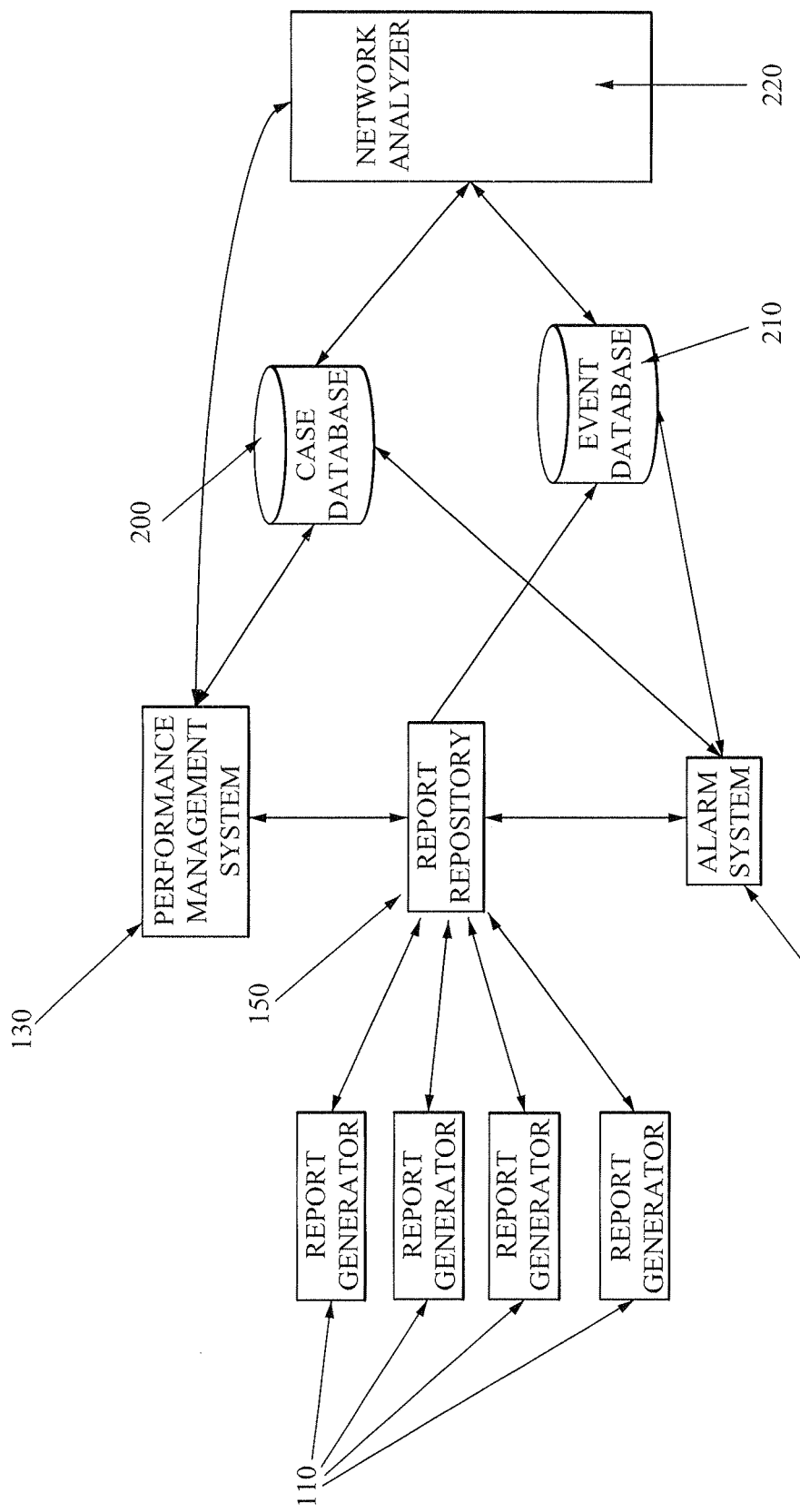
FIG. 2 shows a schematic depiction of a system according to an aspect of the present invention, which may be used to perform a method according to the present invention.

FIG. 2 shows a schematic depiction of a system according to an aspect of the present invention, which may be used to perform a method according to the present invention. The system 100 comprises one or more report generators 110, performance management system 130, report repository 150, alarm system 170, case database 200, event database 210 and network analyzer 220. Again, for the sake of clarity, the network elements and the network are not shown in FIG. 2.

Each of the one or more report generators 110 are associated with one or more network elements such as applications, servers, network nodes (such as switches, routers, etc.), etc. In operation the network elements, or the management systems associated with those network elements, will cause the report generator to send one or more reports to the report repository 150. The one or more reports may comprise status reports, error reports, reports of particular parameters or settings associated with a network element or more general performance reports for one or more network elements. The reports held in the report repository may be accessed by the performance management system 130 and are also formatted and written to the event database 210 (see below). If a report is a fault report then the alarm system 170 will generate one or more fault alarms as appropriate. The performance management system 130 formats data held within the system and then writes the formatted data to the case database 200 (see below).

The network analyzer 220 receives data from both the case database 200 and the event database 210 and analyzes the received data such that historic network data can be used to form correlations between reports generated by different (and possibly disparate) network elements and fault reports which may occur subsequently (see below). Once these correlations have been determined, it is then possible to predict potential fault conditions before they occur such that remedial action may be taken.

Such an approach should result in a more efficient and economic operation of the network as there is a decrease in lost revenue or compensation payments due to a loss of service and it is possible to perform more maintenance in a planned, proactive manner.

Figure 3:
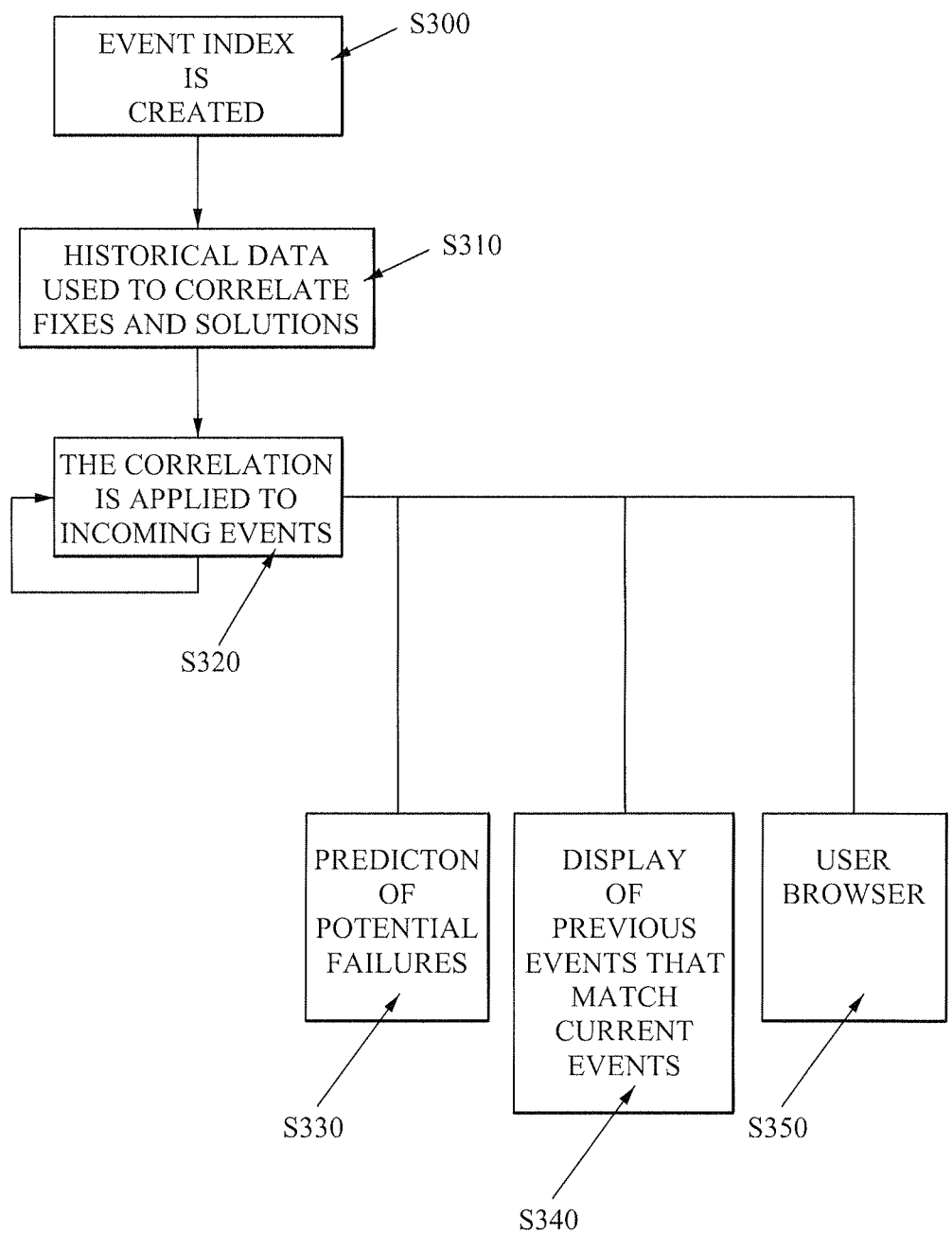
FIG. 3 shows a flowchart which outlines the operation of a system and a method according to the present invention.

FIG. 3 shows a flowchart which outlines the operation of a system and a method according to the present invention. At step S300 an event index is created to enable correlation of events across different network elements; at step S310 historical data is used to correlate fixes and solutions that have been previously implemented to the event patterns that occurred prior to the application of those fixes and solutions. At step S320 the correlation determined in step S310 is applied to incoming events; the results from this correlation enables: the prediction of potential failures (S330); the display of previous events and solutions that match current events (S340); or a user to browse patterns of event patterns, event trends & failures. It will be understood that S320 will be repeated as required as new event data is received; such repletion may be on a periodic basis, may be triggered by the receipt of a given quantity of data or it may be performed continuously in real time (or near real time). The method outlined above with reference to FIG. 3 will now be described in more detail with reference to FIGS. 4 to 8.

Figure 4:
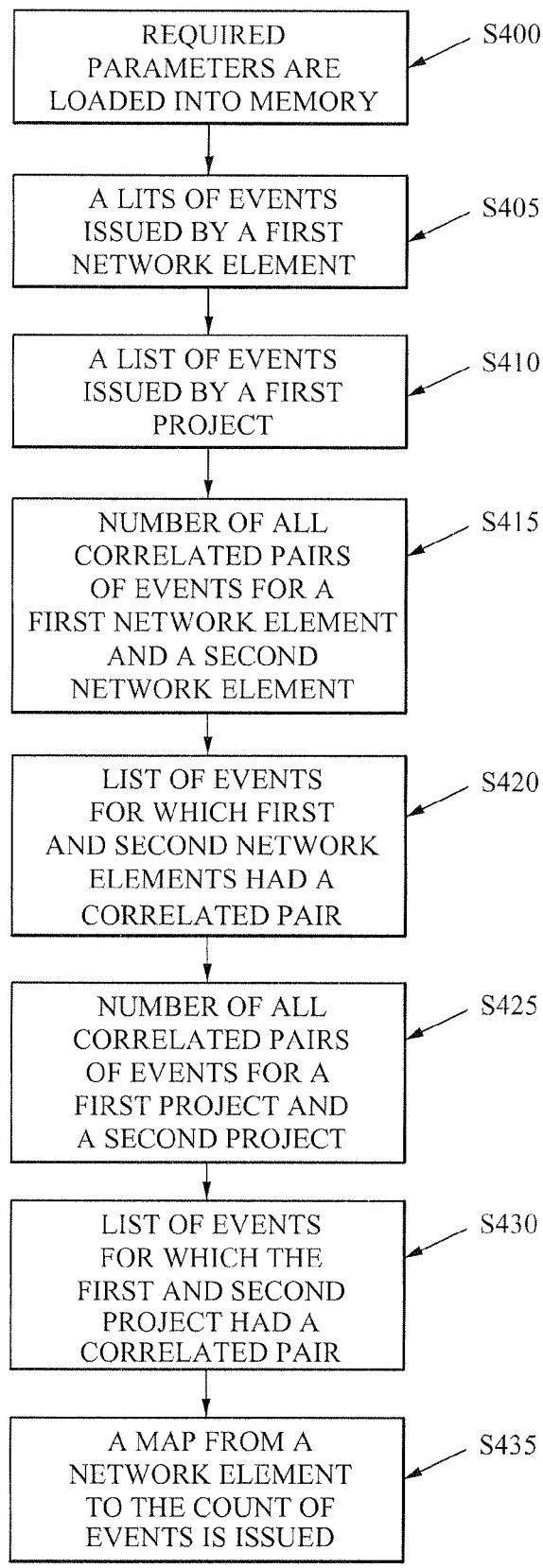
FIG. 4 shows a flowchart which describes a method of creating an event index in order to enable the correlation of events across different network elements.

FIG. 4 shows a flowchart which describes a method of creating an event index in order to enable the correlation of events across different network elements (step S300 above). Before it is possible to correlate events that occur across the network it is essential that the event database is populated with a set of events generated by network elements. Each of the network elements has a unique name and a unique numerical (or alphanumerical) identifier. The event database 210 holds a first hash table which maps network element name to network element identifier and a second hash table which maps network element identifier to network element name. When a network event occurs, it is assigned a unique database identifier and a number of further parameters associated with the network event are stored within the event database 210.

For example, an event may be described by storing the following parameters: network element ID, Project ID, Severity, First Time, Last Time, Case ID, Database ID. The project ID identifies a project or system that is associated with the network element, the severity parameter provides an indication of whether the event is indicative of the element operating normally or whether there is some degree of failure of under-performance, the First Time parameter indicates the first occasion on which a similar event was recorded, the Last Time parameter indicated the most recent recording of a similar event and the Case ID is a reference to an ID that is held in the case database 200 (see below for further details). All of the events that are recorded over a pre-determined period of time are stored within a single vector within the events database.

To enable the network analyser to operate efficiently, the events held in the event vector should be representative of the operation of the network being managed and thus the events should be drawn from a sufficient period of time that will capture variations in network conditions and usage. For example, data covering a period of one year may be required to capture the effects on network performance that are caused by different weather conditions.

Referring to FIG. 4, initially (S400) the required event description fields and parameters are loaded into memory within the network analyser. In order to be able to determine correlations between different devices it is first necessary to extract a number of data sets from these event description fields and parameters. These data sets comprise:

a list of all events issued by a first network element (S405);
a list of events issued by a first project (S410);
the number of all correlated pairs of events for a first network element and a second network element (a correlated pair occurs when an event occurs for both a first and a second network element within a predetermined time period. This time period can be specified as a parameter, is typically in the range of 5 to 60 minutes and preferably is in the range of 20-40 minutes. If the time period is too small then it will not capture a useful number of correlations but if the time period is too large then the amount of data that will need to be processed will grow too large) (S415);
the list of events for which the first and second network elements had a correlated pair (S420);
the number of all correlated pairs of events for a first project and a second project (a correlated pair occurs when an event occurs for both a first and a second project within a predetermined time period. Preferably this time period will be the same as the time period used to determine the number of all correlated pairs of events for a first network element and a second network element (S425);

the list of events for which the first and second projects had a correlated pair (S430); and for each project, and on each day, a map from a network element to the count of events it issued on that day is issued (S435).

These data sets may be described as:

Map: Network Element ID→Vector<Event>

Map: Project Id→Vector<Event>

Map: Pair<Network Element ID, Network-Element ID>→Count

Map: Pair<Network Element ID, Network Element ID>→Pair<Event, Event>

Map: Pair<Project ID, Project ID>→Count

Map: Pair<Project ID, Project ID>→Pair<Event, Event>

Map: Device ID→Count

During the operation of the network, more events will be generated on an ongoing basis. As these events are received within the event database, the data sets listed above will be updated accordingly. Preferably, to enable efficient processing and fast and memory efficient addition of new events, the data sets take the form of hash tables and are stored in memory.

In order to be able to form correlations between events as they occur and events that have occurred historically it is first necessary to determine the probability that a particular network element will generate an event and this network element probability can be determined in accordance with equation 1 (for the sake of clarity NE will be used to represent NetworkElement in the following equations):

$$P(\text{Event}(NE)) = \frac{NEEvents + 1}{AllEvents + AllNEs} \quad [1]$$

where NEEvents is the number of all events issued by a particular network element, AllEvents is the total number of events and AllNEs is the total number of all network elements in the communications network. Rather than simply dividing NEEvents by AllEvents to determine the probability, the equation is modified to incorporate a Laplacian smoothing technique (see A McCallum & K Nigam, "*A Comparison of Event Models for Naive Bayes Text Classification*", AAAI/ICML-98 Workshop on Learning for Text Categorization, (1998) pp 41-48). This technique adds an additional increment to the value of the numerator for each of the network elements and thus the AllNEs term is also added to the denominator. This has the effect of smoothing variations in the probability, particularly where otherwise there would be zero occurrences of a particular event occurring. The Laplacian smoothing technique provides a uniform distribution over all network elements and could be replaced with other smoothing techniques where sufficient data exists regarding the distribution of network elements.

The probability that a first network element and second network element both generate an event within a predetermined time period (referred to as a co-occurrence probability) can be determined in accordance with equation 2:

$$P(\text{Event}(NE1) \text{ and } \text{Event}(NE2)) = \frac{NE1 \text{ and } NE2 \text{ Events} + 1}{AllEventPairs + AllNEs^2} \quad [2]$$

where NEEvents is the number of all event pairs where one event is generated by network element 1 and one event is generated by network element 2, AllEventPairs is the total number of event pairs and AllNEs is the total number of all network elements in the communications network. As has been discussed above with reference to equation [1], Laplacian smoothing terms have been incorporated within equation [2].

Finally, a conditional probability, that network element 2 generates an event given that network element 1 previously generated an event within a predetermined time period, can be determined in accordance with equation [3];

$$P(\text{Event}(NE2) \mid \text{Event}(NE1)) = \frac{NE2AfterNE1 \text{ Events} + 1}{AllAfterEventPairs + AllNEs} \quad [3]$$

where NE2AfterNE1 is the number of all event pairs where the first event is generated by network element 1 and a subsequent event is generated by network element 2, AllAfterEventPairs is the number of all event pairs where network element 1 generates the first event; and AllNEs is the total number of all network elements in the communications network.

It will be seen that the parameters used to determine the probabilities defined in equations [1]-[3] can be extracted easily from the memory maps defined above. Once they have been determined, the three probabilities defined in equations [1]-[3] can be used to define a probabilistic network in which:

nodes correspond to the network elements and are weighted with the respective network element probability undirected edges between nodes are weighted with a co-occurrence probability and directed edges between nodes are weighted with a conditional probability.

The probabilistic network is an abstraction which corresponds to the structure holding the correlations between network elements and projects. It is fully described by the memory maps defined above and equations [1] to [3]. When the system starts, lists of network elements, projects and historic events can be used to initialize the probabilistic network by initializing the memory maps with listed network elements and projects and by initializing the counts using the list of historic events. This removes the need from keeping the system running for a longer period of time (e.g. months) in order to derive good estimates of probabilities. Once the system is running, the probabilistic network can be updated in real-time as the new events are added to the system.

It will be understood that during the normal operation of a network a large number of the events that are captured in the events database will be representative of the normal operation of the network. Attempting to analyse all of the events will require significant computing resources without providing results that are any more meaningful.

Therefore, it is proposed to filter out 'heartbeat' events, which correspond to expected events which would occur on a regular basis during the normal operation of a complex system such as a telecommunications network. Such a filtering can be performed, for example, through the use of an Inverse Network Element Frequency function.

It is known from the field of information retrieval and text mining to use the TF-IDF (term frequency-inverse document frequency) weight. The TDF-IF weight is a statistical measure used to evaluate how important a word is to a document in a collection of documents. The importance increases proportionally to the number of times a word appears in a specific document but is offset by the frequency of the word in the whole collection of documents. Similarly the Inverse Network Element Frequency weight and the probability of an event occurring can be used to eliminate the 'heartbeat' events such that only those events that are more likely to correspond to error states or anomalous conditions are analysed by the network analyser.

Figure 5:
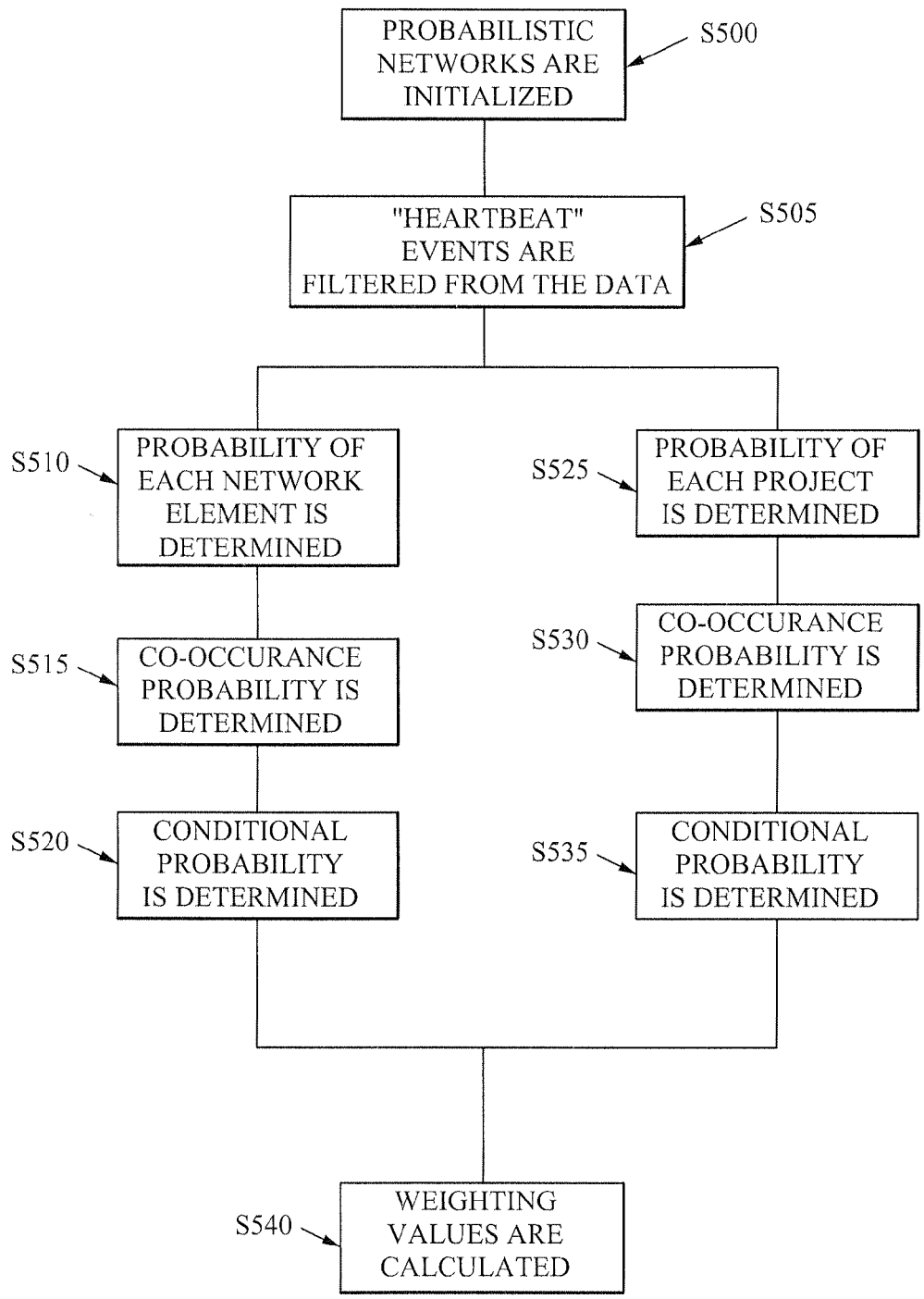
FIG. 5 shows a flowchart which describes a method of determining a set of weighted values which can be used to determine an association between a first event and a second event.
Figure 6:
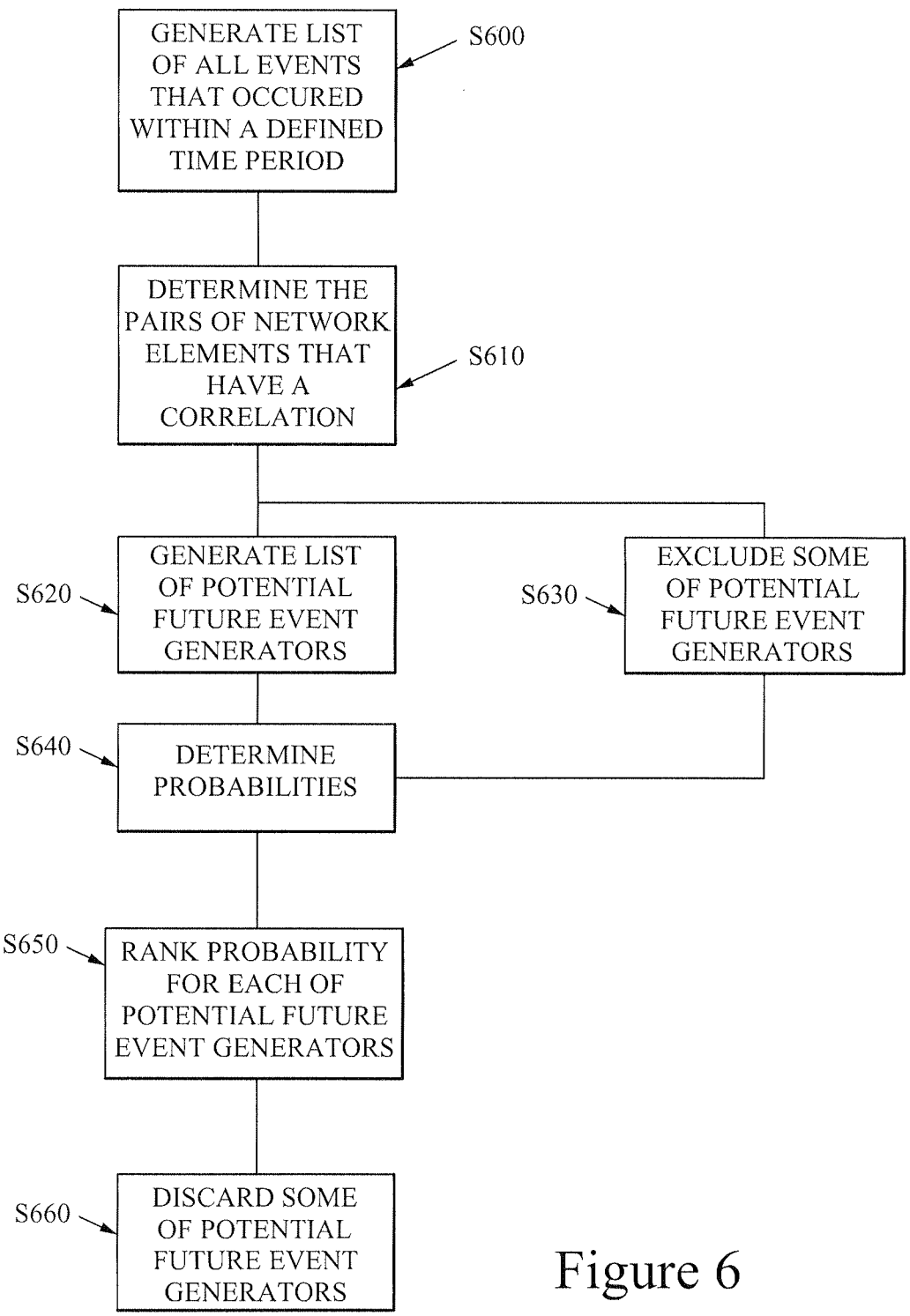
FIG. 6 shows a flowchart which describes a method of predicting which event is most likely to occur given one or more preceding events having occurred.

Referring to FIG. 5, at step S500 the probabilistic networks are initialised and populated with historical data and at step S505 the 'heartbeat' events are filtered from the data. At step S510 the probability of each network element generating a event is determined (see equation [1] above); at step S515 the co-occurrence probability (see equation [2] above) is determined for each network element pair that is held in the relevant index and at step S520 the conditional probability, i.e. that network element 2 generates an event given that network element 1 previously generated an event within a predetermined time period, is determined in accordance with equation [3] for all appropriate pairs of network elements. Similar calculations are made at steps S525, S530 & S535 but with respect to events being issued by projects rather than network elements.

In order to relate a new event to a historical event it is necessary to calculate a relatedness score. The relatedness score, which is defined in equation [4] below, combines the combines the conditional probability measure with a textual similarity measure. The textual similarity measure compares text supplied by human operators thus complementing the statistical measure with additional information from human experts.

$$\text{RelatednessScore} = w_1 \text{ProbScore} + w_2 \text{TextScore} \quad [4]$$

The ProbScore is the conditional probability for the two network elements that generated the events (see equation [3] above), and TextScore is a textual similarity measure that is derived from the summary text that is associated with each of the two events. This measure may be determined using a bag-of-words model with cosine similarity technique. This is a commonly used and efficient technique used in the field of text mining. It will be understood by a person skilled in the art that other text similarity measures could be used as well. The summary text is an automatically generated description of an event (or a text that is associated with an event) such as a status report or an error message.

The ProbScore and the TextScore measures are weighted using associated weighting values $w_1$ and $w_2$. Appropriate values for $w_1$ and $w_2$ can be determined based on a set of events which have been manually related. For any pair of events which are assigned to the same case and which occurred within a predetermined time window then the following condition will apply:

$$w_1 \text{ProbScore} + w_2 \text{TextScore} = 1 \quad [5]$$

Similarly, for any pair of events that are assigned to different cases but that occurred within a predetermined time window then the following condition will apply:

$$w_1 \text{ProbScore} + w_2 \text{TextScore} = 0 \quad [6]$$

All of the instances of equations [5] & [6] can be used as inputs to a logistic regression classifier which can then estimate appropriate weights values for $w_1$ and $w_2$. If the relatedness score exceeds a predetermined threshold then two events under consideration can be considered to be related. A threshold value may be assigned across the whole system or it may be estimated on the basis of historical data (that is, events which can be manually related) one a project or system basis. However, as there are likely to be a small number of events which can be manually related when compared to the total number of events it may not be feasible to make accurate estimations of threshold values at the project level. Referring again to FIG. 5, the values calculated during steps S510, S515 and S520 can be used at step S540 to calculate weighting values for the events as they are associated to network elements. Similarly, at S540 the weighting values can be determined for the events as they are associated to projects.

A further aspect of the invention (see FIG. 6) is the ability of the network analyzer to be able to predict which network element is most likely to next generate an event. It will be readily understood that such a capability would be of significant utility to a network operator, especially if an error event were to be predicted.

In order to be able to able to make such a prediction then first it is necessary to define a period of time (for example one hour) and to generate a list of all of the events that occurred within that defined time period (S600). The events may be collected from a single project, from multiple projects or from across the entire network. This list can then be searched to determine the pairs of network elements that have a correlation, that is for that pair of network elements the co-occurrence probability determined in accordance with equation [2] has a non-zero value (S610). The period of time over which the list of events is defined may be varied but it if is too large then there will be a significant increase in computational complexity and the computing resources required. It has been observed by the inventors that the time period should not be significantly greater than that which is used to determine the number of all correlated pairs of events for a first network element and a second network element.

A list of potential future event generators can then be generated, which will include all combinations of the network elements which generated an event during the defined period of time and those pairs of network elements which have a non-zero co-occurrence probability (S620). In the event that too many potential future event generators are included in this filtered list then it is possible to exclude some of them, for example those which have a co-occurrence probability which is below a predetermined threshold or by only including the network elements which generate events most frequently (S630).

Once the list of potential future event generators has been determined, then the probability that a third network element will issue an event after a first and second network elements both issued an event during the defined period of time is:

$$P(\text{NE3 is next}) = P(\text{NE1}^\frown\text{NE2})P(\text{NE1}^\frown\text{NE3})P(\text{NE2}^\frown\text{NE3}) \quad [7]$$

Equation [7] is based upon the co-occurrence probability that is calculated in accordance with equation [2] above. By multiplying the three different co-occurrence probabilities together it is possible to derive an approximation of the probability of a sequence of network elements (NE1, NE2, NE3) issuing events. The probability of such sequences could be computed directly by counting historic co-occurrences of all three network elements. However, this approach is not preferred as it results in poor performance due to sparse historic data and will lead to a significant increase in computational and memory storage costs Once the probabilities have been determined in accordance with equation [7] (step S640)) then the probabilities for each of the potential future event generators can be ranked (step S650) so that those which are most likely to occur can be investigated. Alternatively, those events which are most likely to be linked to an error may be prioritised for further investigation. Some of the potential future event generators may be discarded in the event that the calculated probability does not exceed a predetermined threshold (step S660).

Rather than just choosing a particular period of time from which to analyse the generated events in order to predict which network elements may subsequently generate further events, it should be understood that it is possible that the method described above may be applied to all of the historical event data that is held for a project or for a network within the event database.

The data held within the event database can be examined in order to determine long term trends and patterns. This can be achieved by defining two time periods that are of interest. FIG. 7a shows two time periods; a first time period which begins at T1 and ends at T2 and a second time period which begins at T2 and ends at T3. FIG. 7b shows an alternative scenario in which there is some time in between the first and second time periods: thus the first time period begins at T1 and ends at T2 and the second time period begins at T3 and ends at T4. The average number of events that are generated per day for each device is determined for both the first and the second time periods. For each device, the difference in these average numbers can be computed using a Chi-square ($\chi^2$) score:

$$\chi^2 = \sum_{i=1}^{AllNEs} \frac{(N_i - n_i)^2}{n_i} \qquad [8]$$

Where $n_i$ corresponds to the number of events a network element i issued on average per day in the period between T1 and T2 and $N_i$ corresponds to the number of events it issued on average between T2 and T3 (or between T3 and T4 in the alternative scenario). The $\chi^2$ score corresponds to the probability of two outcomes coming from different distribution.

It is possible to sort projects in accordance with their $\chi^2$ score. Those which have the highest $\chi^2$ scores are those with the largest variation in the rate of events generated when comparing the second time period to the first time period. Those network elements which have the greatest $\chi^2$ score within a project may be sorted as well.

Figure 8:
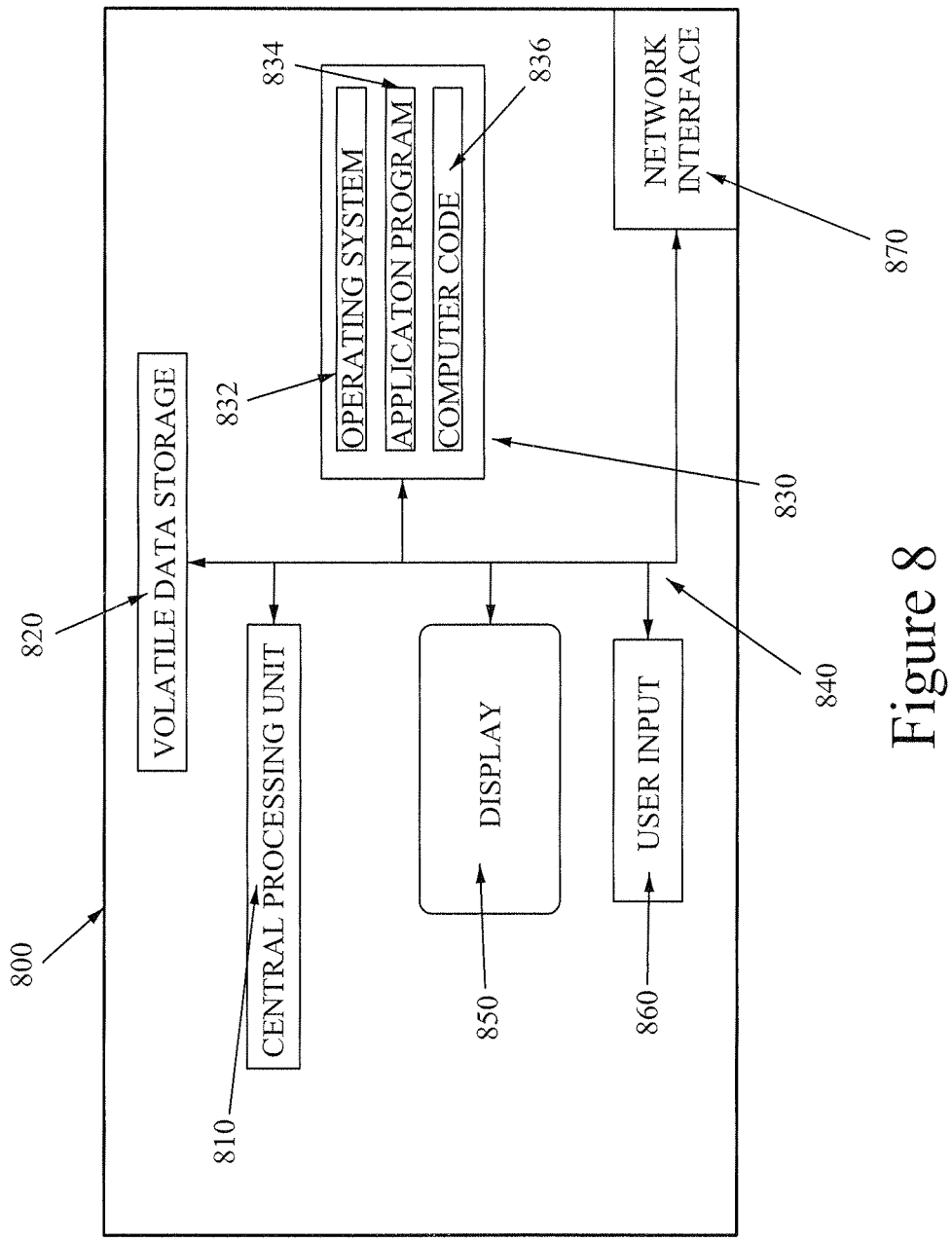
FIG. 8 shows a schematic depiction of an apparatus which can be used to implement a method according to the present invention

A person skilled in the art would recognise that the present invention comprises a number of different processes which can be implemented in software, which can be executed on a general purpose computing apparatus, such as a personal computer or a server computer which can be accessed by a client device or terminal. FIG. 8 shows a schematic depiction of such an apparatus 800, which comprises one or more central processing units 810, volatile data storage means 820 and non volatile data storage means 830, which are interconnected by data bus 840. The apparatus further comprises display means 850, user input means 860 and network interface 870.

The apparatus may comprise integrated display means and user input means, for example a touch screen, for they may be separate, for example a conventional display screen and a keyboard and/or mouse. The non volatile data storage means may comprise one or more hard disc drives; in addition there may be provided removable non volatile data storage means, such as removable hard disc drives or optical media (for example re-writable or recordable DVDs). The network interface may be a local area network adaptor, with the LAN being connected to other LANs and wide area networks (WANs) to enable the apparatus to communicate with and exchange data with other computers. Alternatively, the network interface may be a DSL modem, or similar, that provides a connection to a WAN, such as the Internet or an intranet, which enables communications with further networks.

The non volatile data storage means 830 comprises an operating system 832 and one or more application programmes 834. The operating system comprises the software that the computing apparatus requires to operate, communicate with other computers, receive input from users, display outputs and results to users, etc. Application programs 834 can be executed by the apparatus in order to provide additional functionality. Non volatile data storage means 830 further comprises computer code 836 which can be executed in order to perform a method according to the present invention, for example such as the one described above. It will be understood that the computer code 836 may comprise a single integrated application, or a number of different modules that are accessed separately to execute a method according to the present invention. Each module may perform the functionality of one or more of the processes which comprise the present invention.

For a large telecommunications network, such as that operated by the applicant, one year's operation may result in approximately 80 million events being recorded and this would be equivalent to an event database having a size of approximately 50 GB. In order for the network analyser to be able to analyse data from the event database it will be necessary to hold approximately 10 GB of the event database in memory at any one time. It will be understood that a high end desktop personal computer (for example one having 16 GB RAM and a hard drive of more than 200 GB) would be able to perform the role of the network analyser whilst still having sufficient resources for an operating system, such as Windows, and other applications as might be required. It will be understood that the invention could be implemented on other general computing devices, such as a server that can be accessed by multiple client terminals.

It will be understood that the exact structure of the general purpose computing apparatus is not important as long as it is capable of executing the computer code which performs a method according to the present invention. Such computer code may be deployed to such a general purpose computing apparatus via download, for example via the internet, or on some physical media, for example, DVD, CD-ROM, USB memory stick, etc.

What is claimed is:

1. A method of operating a network comprising a plurality of network elements, the method comprising the steps of:
   a) analysing, via a computer comprising one or more processors, a first datastore comprising data representing historical network performance;
   b) creating within the first datastore:
   i) a first index relating to the probability that a network element generates an alarm event, said probability being proportional to the number of alarm events issued by said network element;
   ii) a second index relating to the probability that a first network element and a second network element both generate an alarm event within a predetermined time period, said probability being proportional to the number of alarm event pairs where an alarm event is issued by said first network element and an alarm event is issued by said second network element; and iii) a third index relating to the probability that a second network element generates an alarm event given that a first network element previously generated an alarm event within a predetermined time period, said probability being proportional to the number of alarm events where said first network element issues a first alarm event and then said second network element issues a second alarm event;

c) creating one or more probability networks in accordance with the indices created in step b);

d) determining from the one or more probability networks a conditional probability associated with an alarm event; and e) if the conditional probability determined in step d) is less than a threshold value, disregarding the associated alarm event; or f) if the conditional probability determined in step d) is greater than a threshold value, using the associated alarm event in conjunction with other historical network data to predict future alarm events.

2. The method according to claim 1 further comprising g) identifying one or more root cause alarm event from a set of such events.

3. The method according to claim 1, wherein the or each probability networks comprise a plurality of nodes, each of the nodes corresponding to a network element comprised within the network.

4. The method according to claim 3, wherein each of the probability network nodes are weighted in accordance with the probability that the corresponding network element generates an alarm event.

5. The method according to claim 1, wherein the or each probability networks comprise a plurality of undirected edges, each of the undirected edges connecting a respective first node and a respective second node.

6. The method according to claim 5, wherein each of the plurality of undirected edges is weighted in accordance with the probability that the network element associated with the respective first node and the network element associated with the respective second node both generate an alarm event within a predetermined period of time.

7. The method according to claim 1, wherein the or each probability networks comprise a plurality of directed edges, each of the directed edges connecting a respective first node and a respective second node.

8. The method according to claim 7, wherein each of the plurality of directed edges is weighted in accordance with the probability that:

i) the network element associated with the respective first node generates a first alarm event;

ii) the network element associated with the respective second node generates a second alarm event;

iii) the second alarm event being generated after the first alarm event and within a predetermined period of time after the generation of the first alarm event.

9. A non-transitory computer-readable storage medium having stored therein a computer executable code configured to perform the method according to claim 1.

10. An apparatus comprising a central processing unit, volatile data storage and non volatile data storage, the apparatus being configured to perform the method according to claim 1.

* * * * *